US008446493B2

(12) United States Patent
Utsugi

(10) Patent No.: US 8,446,493 B2
(45) Date of Patent: May 21, 2013

(54) IMAGE PROCESSING APPARATUS, IMAGING APPARATUS, COMPUTER READABLE STORAGE MEDIUM STORING IMAGE PROCESSING PROGRAM, AND IMAGE PROCESSING METHOD FOR PERFORMING COLOR PROCESSING ON A RAW IMAGE

(75) Inventor: Akihiko Utsugi, Machida (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/365,617

(22) Filed: Feb. 3, 2012

(65) Prior Publication Data
US 2012/0200733 A1 Aug. 9, 2012

(30) Foreign Application Priority Data

Feb. 9, 2011 (JP) ................................. 2011-026432

(51) Int. Cl.
*H04N 9/68* (2006.01)
*H04N 5/228* (2006.01)
(52) U.S. Cl.
USPC ........ 348/237; 348/222.1; 348/242; 348/280; 382/162
(58) Field of Classification Search
None
See application file for complete search history.

(56) References Cited

U.S. PATENT DOCUMENTS 6,980,326 B2 * 12/2005 Tsuchiya et al. .............. 358/1.9
7,148,924 B2 * 12/2006 Hiroshige et al. ............ 348/252
7,773,127 B2 * 8/2010 Zimmer et al. ............ 348/231.6
8,013,928 B2 * 9/2011 Egawa .......................... 348/345
8,330,772 B2 * 12/2012 Cote et al. .................... 345/611
2001/0052971 A1 12/2001 Tsuchiya et al.
2009/0160992 A1 6/2009 Inaba et al.

FOREIGN PATENT DOCUMENTS

| JP | A-06-014189 | 1/1994 |
| JP | B2-3689607 | 8/2005 |
| JP | A-2009-010823 | 1/2009 |
| JP | A-2009-153013 | 7/2009 |

OTHER PUBLICATIONS

Feb. 5, 2013 Office Action issued in Japanese Patent Application No. 2011-026432 (with translation).

* cited by examiner

*Primary Examiner* — Ngoc-Yen Vu
(74) *Attorney, Agent, or Firm* — Oliff & Berridge, PLC

(57) ABSTRACT

In order to effectively and efficiently perform noise reduction by smoothing, an image processing apparatus of the present invention includes an image inputting part inputting an image in which a first pixels and a second pixels indicating mutually different color components are included and at least the second pixels are arranged at discrete positions, a color estimating part estimating first color component data at the second pixels based on first color component data of the first pixels, a calculating part calculating color-difference data at the second pixels based on the first color component data at the second pixels and second color component data of the second pixels, a smoothing part performing smoothing processing on a discrete color-difference image formed of the color-difference data being calculated at the second pixels, and a color-difference estimating part estimating color-difference data at pixels other than the second pixels on the input image.

6 Claims, 8 Drawing Sheets

Fig. 3

| B | G | B | G | B | G | B |
|---|---|---|---|---|---|---|
| G | R | G | R | G | R | G |
| B | G | B | G | B | G | B |
| G | R | G | R | G | R | G |
| B | G | B | G | B | G | B |
| G | R | G | R | G | R | G |
| B | G | B | G | B | G | B |

IN CASE OF VERTICAL
LINEAR STRUCTURE

IN CASE OF HORIZONTAL
LINEAR STRUCTURE

IN CASE OF FIRST OBLIQUE
LINEAR STRUCTURE

IN CASE OF SECOND
OBLIQUE LINEAR STRUCTURE

OTHER THAN THOSE

IN CASE OF VERTICAL
LINEAR STRUCTURE

IN CASE OF HORIZONTAL
LINEAR STRUCTURE

OTHER THAN THOSE

IMAGE PROCESSING APPARATUS, IMAGING APPARATUS, COMPUTER READABLE STORAGE MEDIUM STORING IMAGE PROCESSING PROGRAM, AND IMAGE PROCESSING METHOD FOR PERFORMING COLOR PROCESSING ON A RAW IMAGE

CROSS-REFERENCE TO THE RELATED APPLICATION

This application is based upon and claims the benefit of priority from Japanese Patent Application No. 2011-026432, filed on Feb. 9, 2011, the entire contents of which are incorporated herein by reference.

BACKGROUND

1. Field

The present application relates to an image processing apparatus, an imaging apparatus, a computer readable storage medium storing an image processing program, and an image processing method performing processing on a RAW image (image before performing color interpolation) obtained by a color image sensor of single panel type.

2. Description of the Related Art

Conventionally, noise reduction processing through smoothing performed by a digital camera, an image processing software and the like is generally performed on a color-interpolated image, not on a RAW image (refer to Japanese Unexamined Patent Application Publication No. H06-14189, Japanese Patent No. 3689607, Japanese Unexamined Patent Application Publication No. 2009-10823, and the like).

Further, although not disclosed in these documents, a technique for performing noise reduction processing on respective color components of a RAW image has already been proposed.

Normally, in a process of color interpolation processing, a brightness and a color difference of each pixel are made known, so that it is possible to perform aggressive noise reduction processing on a color-interpolated image without blurring an edge of a structure included in the image, but, since the color-interpolated image has a large number of pixels, a calculation amount required for the noise reduction processing becomes enormous.

Meanwhile, since a RAW image has a small number of pixels, it is possible to perform the noise reduction processing on the RAW image with a small calculation amount, but, a brightness and a color difference of each pixel are not separated before performing the color interpolation, so that when an edge of a structure included in the image is tried to be maintained, too aggressive noise reduction processing cannot be performed.

SUMMARY

The present application has a proposition to solve the above-described problems, and to provide an image processing apparatus, an imaging apparatus, an image processing program, and an image processing method capable of effectively and efficiently performing noise reduction by smoothing.

An aspect of an image processing apparatus of the present embodiment includes an image inputting part inputting an image in which a first pixel group and a second pixel group indicating mutually different color components are included and at least pixels of the second pixel group are arranged in discrete positions, a color estimating part estimating first color component data at the discrete pixel positions of the second pixel group based on first color component data belong to pixels of the first pixel group, a calculating part calculating color-difference data at the discrete pixel positions of the second pixel group based on the first color component data being estimated at the discrete pixel positions of the second pixel group and second color component data belong to the pixels of the second pixel group, a smoothing part performing smoothing processing on a discrete color-difference image formed of the color-difference data being calculated at the discrete pixel positions of the second pixel group, and a color-difference estimating part estimating color-difference data at pixel positions of pixel group other than the second pixel group on the image input by the image inputting part based on the discrete color-difference image after being smoothed.

Note that the smoothing processing may also include prominent noise reduction processing.

Further, it is also possible that the one aspect of the image processing apparatus of the present embodiment further includes a brightness generating part estimating brightness data at pixel positions of pixel groups on the image input by the image inputting part based on the first color component data of the pixels of the first pixel group and the second color component data of the pixels of the second pixel group; and a reducing part performing, on a brightness image formed of the brightness data being estimated at the pixel positions of the pixel groups, size reducing process for matching an image size of the brightness image to an image size of the discrete color-difference image, in which the smoothing part sets a parameter of the smoothing processing based on the brightness image after being reduced in size.

Further, an aspect of an imaging apparatus of the present embodiment includes a color imaging sensor obtaining an image in which a first pixel group and a second pixel group indicating mutually different color components are included and at least pixels of the second pixel group are arranged in discrete positions, and the one aspect of the image processing apparatus inputting and processing the image.

Further, an aspect of a computer readable storage medium storing an image processing program of the present embodiment causes a computer to execute an image inputting step inputting an image in which a first pixel group and a second pixel group indicating mutually different color components are included and at least pixels of the second pixel group are arranged in discrete positions, a color estimating step estimating first color component data at the discrete pixel positions of the second pixel group based on first color component data belong to pixels of the first pixel group, a calculating step calculating color-difference data at the discrete pixel positions of the second pixel group based on the first color component data being estimated at the discrete pixel positions of the second pixel group and second color component data belong to the pixels of the second pixel group, a smoothing step performing smoothing processing on a discrete color-difference image formed of the color-difference data being calculated at the discrete pixel positions of the second pixel group, and a color-difference estimating step estimating color-difference data at pixel positions of pixel group other than the second pixel group on the image input by the image inputting step based on the discrete color-difference image after being smoothed.

Further, an aspect of an image processing method of the present embodiment includes an image inputting step inputting an image in which a first pixel group and a second pixel group indicating mutually different color components are included and at least pixels of the second pixel group are arranged in discrete positions, a color estimating step estimating first color component data at the discrete pixel positions of the second pixel group based on first color component data belong to pixels of the first pixel group, a calculating step calculating color-difference data at the discrete pixel positions of the second pixel group based on the first color component data being estimated at the discrete pixel positions of the second pixel group and second color component data belong to the pixels of the second pixel group, a smoothing step performing smoothing processing on a discrete color-difference image formed of the color-difference data being calculated at the discrete pixel positions of the second pixel group, and a color-difference estimating step estimating color-difference data at pixel positions of pixel group other than the second pixel group on the image input by the image inputting step based on the discrete color-difference image after being smoothed.

BRIEF DESCRIPTION OF THE DRAWINGS

FIG. 3 is a diagram explaining a Bayer array.

DETAILED DESCRIPTION OF THE EMBODIMENTS

First Embodiment

Hereinafter, an electronic camera will be explained as a first embodiment of the present invention.

Figure 1:
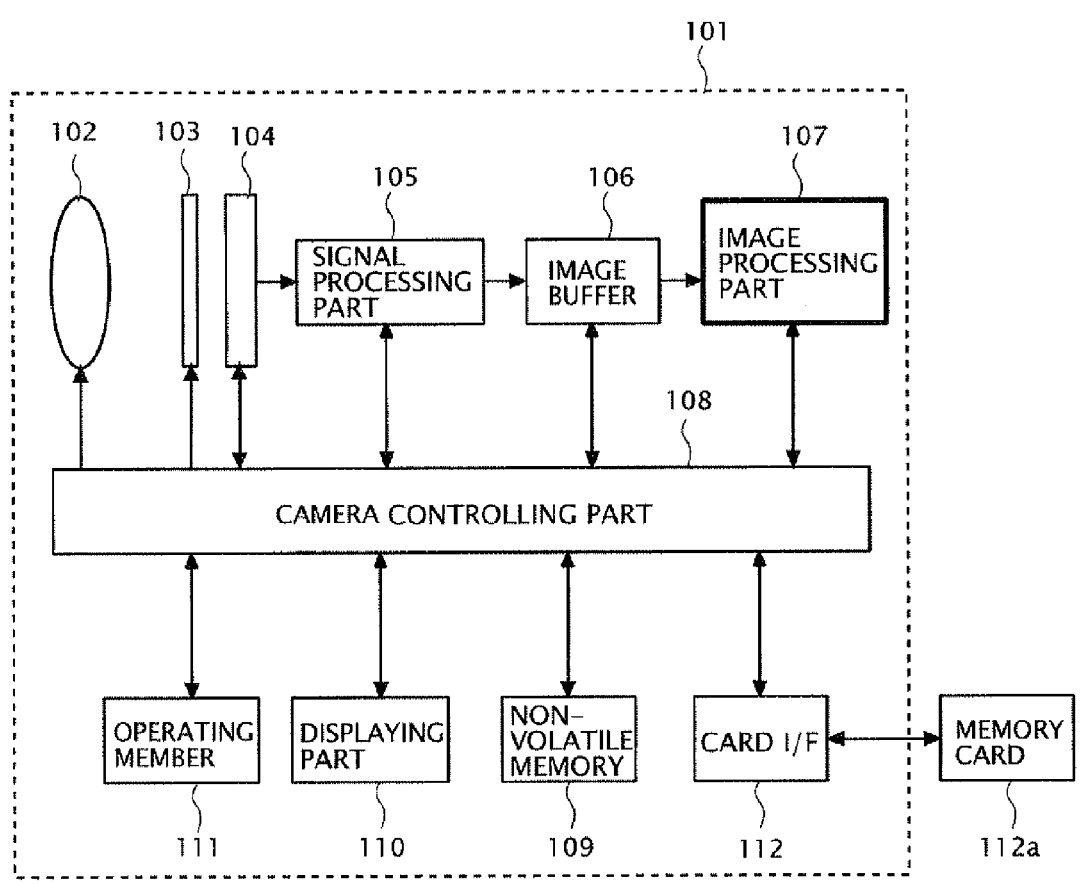
FIG. 1 is a block diagram illustrating an entire configuration of an electronic camera 101.

FIG. 1 is a block diagram illustrating an entire configuration of an electronic camera 101. As illustrated in FIG. 1, the electronic camera 101 includes a shooting optical system 102, a mechanical shutter 103, a color imaging sensor 104, a signal processing part 105, an image buffer 106, an image processing part 107, a camera controlling part 108, a nonvolatile memory 109, a displaying part 110, an operating member 111, and a card interface (card I/F) 112. Note that a memory card 112a being a portable storage medium can be attached/detached to/from the electronic camera 101.

The shooting optical system 102 forms an image of luminous flux emitted from a field (luminous flux from the field) on an imaging area of the color imaging sensor 104. The shooting optical system 102 includes a lens, an aperture, a lens driving part, and the like, in which the lens driving part adjusts a position of the lens, a diameter of the aperture, and the like, in accordance with an instruction from the camera controlling part 108.

The mechanical shutter 103 opens/closes an optical path of the luminous flux from the field. A period of time during which the optical path is opened by the mechanical shutter 103 is controlled by the camera controlling part 108.

The color imaging sensor 104 is a color image sensor of single panel type having a color filter array, and arranges a plurality of pixels of a plurality of types having sensitivity with respect to mutually different colors, on the same plane in a mixed manner (in a mosaic pattern). Pixel signals generated in respective pixels of the color imaging sensor 104 are sequentially read in accordance with a driving signal given by the camera controlling part 108. Hereinafter, it is assumed that a Bayer array is adopted as a filter array of the color filter array.

The signal processing part 105 performs various signal processing on the pixel signals sequentially read from the color imaging sensor 104. The signal processing include amplification processing for amplifying an image signal, A/D conversion processing converting the pixel signal into a digital signal (digital pixel signal), and the like. Out of the above, an amplification factor in the amplification processing is appropriately set by the camera controlling part 108, and the amplification factor determines a shooting sensitivity of the electronic camera 101. Note that timings of the various signal processing in the signal processing part 105 are controlled by the camera controlling part 108.

The image buffer 106 is a volatile high-speed memory, and sequentially accumulates the digital pixel signals output from the signal processing part 105. Accordingly, when the pixels signals corresponding to one frame are read from the color imaging sensor 104, the digital pixel signals corresponding to one frame are accumulated in the image buffer 106. Hereinafter, the digital pixel signals corresponding to one frame accumulated in the image buffer 106 as above are referred to as "RAW image". Note that the image buffer 106 can also store an image other than the RAW image, in accordance with an instruction from the camera controlling part 108.

Here, the RAW image is an image in which a plurality of pixels of a plurality of types exhibiting intensities of mutually different color components are arranged in a mosaic pattern, in which the pixels of the mutually different types have pieces of data of mutually different color components (color component data). When the Bayer array is adopted as the filter array of the color filter array as described above, the array of pixels in the RAW image also adopts the Bayer array. In this case, the RAW image corresponds to an image in which an R-pixel having only R-component data, a G-pixel having only G-component data, and a B-pixel having only B-component data are repeatedly arranged with regularity as illustrated in FIG. 3.

The image processing part 107 performs, in accordance with an instruction from the camera controlling part 108, various image processing including color interpolation processing on the RAW image on the image buffer 106. Further, the image processing part 107 can also perform, in accordance with an instruction from the camera controlling part 108, data compression processing on an image after being subjected to the image processing.

The operating member 111 includes a mode selection dial, a release button, and the like. A user can input various instructions into the camera controlling part 108 via the operating member 111.

The displaying part 110 is, for example, a liquid crystal display provided on a back surface of the electronic camera

101. The displaying part 110 appropriately displays an image specified by the camera controlling part 108.

The nonvolatile memory 109 is formed of a flash memory being a type of semiconductor memory, for example. In the nonvolatile memory 109, various parameters to be referred to by the camera controlling part 108 are stored, and these parameters are appropriately updated by the user.

The card I/F 112 performs writing of data specified by the camera controlling part 108 into the memory card 112*a*, and reading of data specified by the camera controlling part 108 from the memory card 112*a*.

The camera controlling part 108 includes a CPU, a ROM, and the like, in which the CPU controls respective parts of the electronic camera 101 in accordance with programs (including a program regarding a capturing of image and a program regarding the image processing) previously stored in the ROM, and an instruction input by the user.

For example, when a shooting instruction is input by the user, the camera controlling part 108 drives the shooting optical system 102, the mechanical shutter 103, the color imaging sensor 104, and the signal processing part 105, to thereby obtain a RAW image to make the image buffer 106 accumulate the image.

Thereafter, the camera controlling part 108 gives an instruction to the image processing part 107 to perform the aforementioned various image processing on the RAW image on the image buffer 106, and transmits an image after being subjected to the image processing to the displaying part 110.

Further, the camera controlling part 108 gives an instruction to the image processing part 107 to perform data compression on the image after being subjected to the image processing to create an image file (JPEG file) of the image after being subjected to the data compression, and gives an instruction to the card I/F 112 to write the image file into the memory card 112*a*.

Further, the camera controlling part 108 creates an image file of the RAW image (RAW image file) according to need, and gives an instruction to the card I/F 112 to write the RAW image file together with the JPEG file into the memory card 112*a*.

Figure 2:
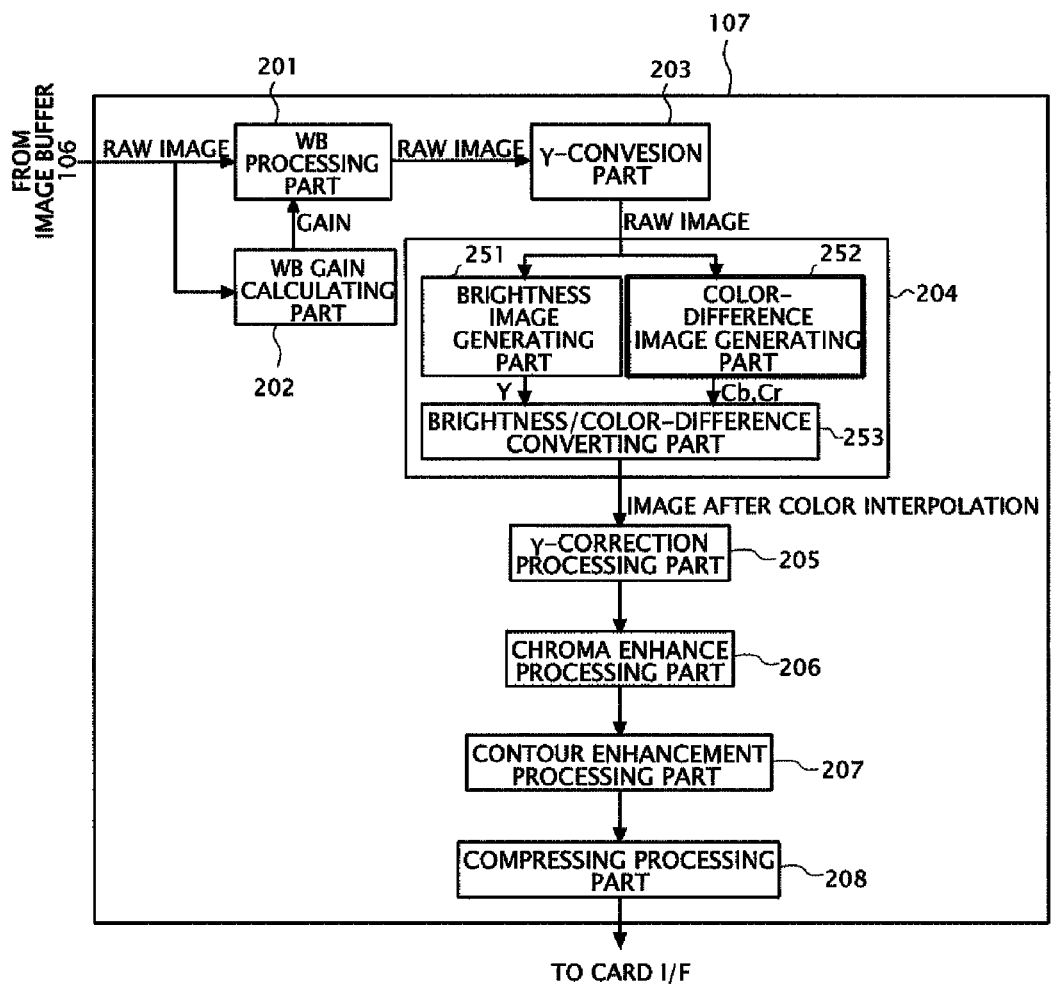
FIG. 2 is a block diagram illustrating a configuration of an image processing part 107.

FIG. 2 is a block diagram illustrating a configuration of the image processing part 107. As illustrated in FIG. 2, the image processing part 107 includes a white-balance processing part (WB processing part) 201, a white-balance gain calculating part (WB gain calculating part) 202, a γ-conversion part 203, a color interpolation processing part 204, a γ-correction processing part 205, a chroma enhance processing part 206, a contour enhancement processing part 207, and a compressing processing part 208.

The white-balance gain calculating part 202 calculates, based on the RAW image, for example, white-balance gains (a gain for R-pixel, a gain for B-pixel) for representing a subject of achromatic color by the achromatic color, without depending on a characteristic of environment light that illuminates the field. The calculated white-balance gains (the gain for R-pixel, the gain for B-pixel) are given to the white-balance processing part 201.

The white-balance processing part 201 multiplies the given white-balance gains (the gain for R-pixel, the gain for B-pixel) to respective R-pixels and respective B-pixels on the RAW image. Accordingly, the white-balance processing is applied to the RAW image.

The γ-conversion part 203 performs gradation conversion processing (γ-conversion) having a previously determined characteristic, on the RAW image after being subjected to the white-balance processing. The γ-conversion corresponds to pre-processing of color interpolation processing, and generates a RAW image having a gradation suitable for the color interpolation.

The color interpolation processing part 204 includes a brightness image generating part 251, a color-difference image generating part 252, and a brightness/color-difference converting part 253, and performs color interpolation processing on the RAW image after being subjected to the γ-conversion to create a color-interpolated image.

The brightness image generating part 251 of the color interpolation processing part 204 generates brightness data Y at each pixel position of the color-interpolated image. Specifically, the brightness image generating part 251 generates a brightness component of the color-interpolated image (namely, a brightness image).

The color-difference image generating part 252 of the color interpolation processing part 204 generates first color-difference data Cr at each pixel position of the color-interpolated image, and generates second color-difference data Cb at each pixel position of the color-interpolated image. Specifically, the color-difference image generating part 252 generates a first color-difference component of the color-interpolated image (namely, a first color-difference image) and a second color-difference component of the color-interpolated image (namely, a second color-difference image).

The brightness/color-difference converting part 253 performs matrix calculation (refer to the following expression) on each pixel of the color-interpolated image, for each pixel, thereby performing color coordinate conversion on color coordinates of the color-interpolated image from YCbCr coordinates into RGB coordinates (performing YCbCr-RGB conversion).

$$\begin{pmatrix} R \\ G \\ B \end{pmatrix} = \begin{pmatrix} 1 & +1.402 & 0 \\ 1 & -0.714 & -0.344 \\ 1 & 0 & +1.772 \end{pmatrix} \begin{pmatrix} Y \\ Cr \\ Cb \end{pmatrix}$$

In the image after being subjected to the color coordinate conversion, respective pieces of color component data which were missing in the respective pixels in the RAW image are interpolated.

Specifically, the color interpolation processing part 204 in FIG. 2 outputs an image in which all pixels have all pieces of color component data (R, G, B) without missing of the data (image after being subjected to the color coordinate conversion), as the color-interpolated image.

The γ-correction processing part 205 performs gradation conversion processing on the image after being subjected to the color coordinate conversion, for each color component. By the gradation conversion, an image having a gradation suitable for an output medium is obtained.

The chroma enhance processing part 206 performs color conversion processing for enhancing a chroma, on the image after being subjected to the gradation conversion. Note that there is no problem if the color conversion processing includes processing for converting a color space to which the respective pixels belong into a color space suitable for the output medium.

The contour enhancement processing part 207 performs processing for enhancing an edge, on the color-converted image. The edge corresponds to an edge of a structure in the image. The contour enhancement processing is, for example, processing for extracting an edge component by performing processing using a difference filter such as a Laplacian filter on an image, and adding the edge component to the image.

The compressing processing part 208 performs data compression processing based on a predetermined form such as JPEG standard, on the contour-enhanced image.

Next, an example of processing of the brightness image generating part 251 will be described based on FIG. 4A, FIG. 4B, and FIGS. 5A to 5E.

The brightness image generating part 251 generates brightness data Y at each G-pixel position on the RAW image, brightness data Y at each R-pixel position on the RAW image, and brightness data Y at each B-pixel position, in the following manner, for example.

(Generation of Brightness Data at G-Pixel Position)

The brightness image generating part 251 executes the following processing with respect to each G-pixel position on the RAW image (refer to FIG. 3).

Figure 4A:
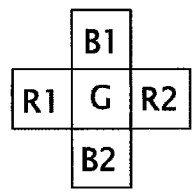
FIGS. 4A and 4B are diagrams explaining a generating step of brightness image.
Figure 4B:
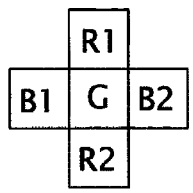

Specifically, the brightness image generating part 251 performs weighting average on G-component data G of a G-pixel at a targeted G-pixel position, and pieces of color component data of four pixels adjacent to the G-pixel position at the top, bottom, left, and right, thereby generating brightness data Y at the G-pixel position, as illustrated in FIG. 4A or FIG. 4B. Note that in the weighting average, a ratio among a weight of G-component data, a weight of R-component data, and a weight of B-component data is set to 2:1:1. Even when an array in the periphery of the G-pixel position is either one in FIG. 4A or one in FIG. 4B, an expression of the weighting average becomes $Y=(4G+B1+B2+R1+R2)/8$.

(Generation of Brightness Data at R-Pixel Position)

The brightness image generating part 251 executes the following processing with respect to each R-pixel position on the RAW image.

First, the brightness image generating part 251 calculates an absolute value of a difference between pieces of G-component data of two G-pixels adjacent to a targeted R-pixel position at the top and bottom, as a contrast evaluation value in a vertical direction.

Further, the brightness image generating part 251 calculates an absolute value of a difference between pieces of G-component data of two G-pixels adjacent to the R-pixel position at the left and right, as a contrast evaluation value in a horizontal direction.

Further, the brightness image generating part 251 calculates a sum of an absolute value of a difference between the pieces of G-component data of the two G-pixels adjacent to the R-pixel position at the top and left, and an absolute value of a difference between the pieces of G-component data of the two G-pixels adjacent to the R-pixel position at the right and bottom, as a contrast evaluation value in a first oblique linear direction (direction from the upper right toward the lower left).

Further, the brightness image generating part 251 calculates a sum of an absolute value of a difference between the pieces of G-component data of the two G-pixels adjacent to the R-pixel position at the top and right, and an absolute value of a difference between the pieces of G-component data of the two G-pixels adjacent to the R-pixel position at the left and bottom, as a contrast evaluation value in a second oblique linear direction (direction from the upper left toward the lower right).

Subsequently, the brightness image generating part 251 compares the contrast evaluation value in the vertical direction, the contrast evaluation value in the horizontal direction, the contrast evaluation value in the first oblique linear direction, and the contrast evaluation value in the second oblique linear direction.

Figure 5A:
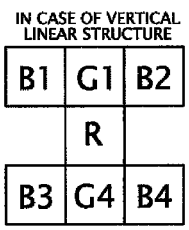
FIGS. 5A, 5B, 5C, 5D, and 5E are diagrams explaining the generating step of brightness image.

Further, when the contrast evaluation value in the vertical direction is the smallest value, the brightness image generating part 251 regards that a brightness structure at the R-pixel position is a vertical linear structure, and performs weighting average on pieces of color component data of seven pixels other than the two pixels adjacent to the R-pixel position at the left and right, among nine pixels in which the R-pixel position is set as a center, thereby calculating brightness data Y at the R-pixel position, as illustrated in FIG. 5A. Note that in the weighting average, a ratio among a weight of R-component data, a weight of B-component data, and a weight of G-component data is set to 1:1:2. Specifically, the weighting average is conducted by using an expression of $Y=(4G+R1+R2+B1+B2)/8$.

Figure 5B:
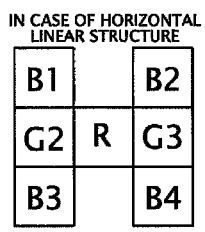

Further, when the contrast evaluation value in the horizontal direction is the smallest value, the brightness image generating part 251 regards that the brightness structure at the R-pixel position is a horizontal linear structure, and performs weighting average on pieces of color component data of the seven pixels other than the two pixels adjacent to the R-pixel position at the top and bottom, among the nine pixels in which the R-pixel position is set as the center, thereby calculating the brightness data Y at the R-pixel position, as illustrated in FIG. 5B. Note that also in the weighting average, a ratio among the weight of R-component data, the weight of B-component data, and the weight of G-component data is set to 1:1:2.

Figure 5C:
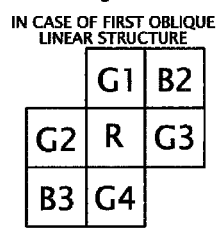

Further, when the contrast evaluation value in the first oblique linear direction is the smallest value, the brightness image generating part 251 regards that the brightness structure at the R-pixel position is a first oblique linear structure, and performs weighting average on pieces of color component data of the seven pixels other than the two pixels at the upper left and the lower right of the R-pixel position, among the nine pixels in which the R-pixel position is set as the center, thereby calculating the brightness data Y at the R-pixel position, as illustrated in FIG. 5C. Note that also in the weighting average, a ratio among the weight of R-component data, the weight of B-component data, and the weight of G-component data is set to 1:1:2.

Figure 5D:
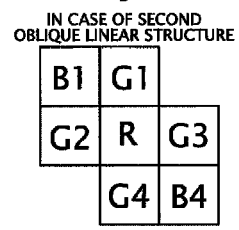

Further, when the contrast evaluation value in the second oblique linear direction is the smallest value, the brightness image generating part 251 regards that the brightness structure at the R-pixel position is a second oblique linear structure, and performs weighting average on pieces of color component data of the seven pixels other than the two pixels at the upper right and the lower left of the R-pixel position, among the nine pixels in which the R-pixel position is set as the center, thereby calculating the brightness data Y at the R-pixel position, as illustrated in FIG. 5D. Note that also in the weighting average, a ratio among the weight of R-component data, the weight of B-component data, and the weight of G-component data is set to 1:1:2.

Figure 5E:
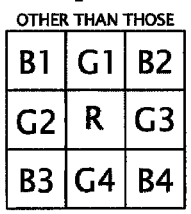

However, when a variation in the above-described four types of contrast evaluation values is less than a threshold value, the brightness image generating part 251 regards that the brightness structure at the R-pixel position is uniform, and performs weighting average on all pieces of color component data of the nine pixels in which the R-pixel position is set as the center, thereby calculating the brightness data Y at the R-pixel position, as illustrated in FIG. 5E. Note that also in the weighting average, a ratio among the weight of R-component data, the weight of B-component data, and the weight of G-component data is set to 1:1:2.

(Generation of Brightness Data at B-Pixel Position)

The brightness image generating part 251 generates brightness data Y at each B-pixel position by executing processing similar to the aforementioned processing (generation of brightness data at the R-pixel position) with respect to each B-pixel position on the RAW image. (The above is the explanation of the operation of the brightness image generating part 251.) Next, details of processing of the color-difference image generating part 252 will be described based on FIG. 6, FIGS. 7A to 7C, and FIG. 8.

Figure 6:
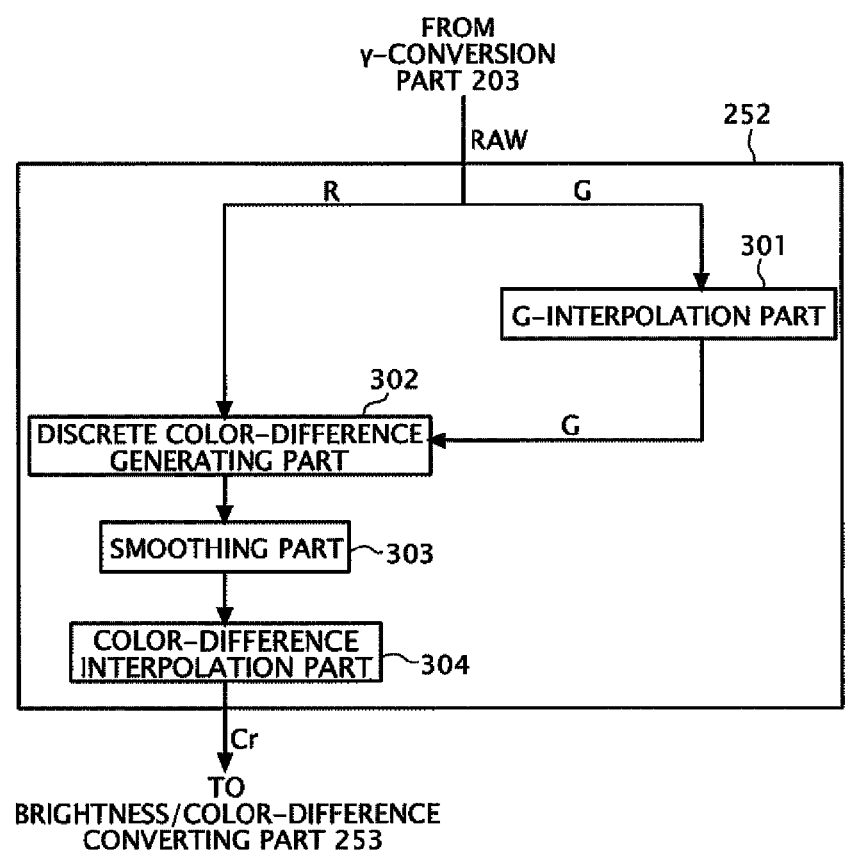
FIG. 6 is a block diagram illustrating a configuration of a color-difference image generating part 252 of a first embodiment.

As illustrated in FIG. 6, the color-difference image generating part 252 includes a G-interpolation part 301, a discrete color-difference generating part 302, a smoothing part 303, and a color-difference interpolation part 304.

The G-interpolation part 301, the discrete color-difference generating part 302, and the smoothing part 303 of the color-difference image generating part 252 generate first color-difference data Cr at each R-pixel position on the RAW image, and generate second color-difference data Cb at each B-pixel position on the RAW image. Further, the color-difference interpolation part 304 of the color-difference image generating part 252 generates, based on the first color-difference data Cr at each R-pixel position on the RAW image, first color-difference data Cr at another pixel position on the RAW image, and generates, based on the second color-difference data Cb at each B-pixel position on the RAW image, second color-difference data Cb at another pixel position on the RAW image.

Out of the above, a processing procedure of the color-difference image generating part 252 at the time of generating the first color-difference data Cr and a processing procedure of the color-difference image generating part 252 at the time of generating the second color-difference data Cb are the same, and the processing procedures are different only in that the former is processing regarding the R-pixel, and the latter is processing regarding the B-pixel. Accordingly, only an operation of the color-difference image generating part 252 at the time of generating the first color-difference data Cb will be explained here as representative.

(Operation of G-Interpolation Part 301)

The G-interpolation part 301 executes the following processing with respect to each R-pixel position on the RAW image, thereby generating temporary G-component data at each R-pixel position.

First, the G-interpolation part 301 calculates an absolute value of a difference between pieces of G-component data of two G-pixels adjacent to a targeted R-pixel position at the top and bottom, as a contrast evaluation value in a vertical direction. Further, the G-interpolation part 301 calculates an absolute value of a difference between pieces of G-component data of two G-pixels adjacent to the R-pixel position at the left and right, as a contrast evaluation value in a horizontal direction.

Thereafter, the G-interpolation part 301 compares the contrast evaluation value in the vertical direction with the contrast evaluation value in the horizontal direction.

Figure 7A:
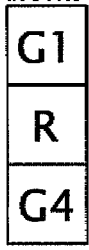
FIGS. 7A, 7B, and 7C are diagrams explaining an operation of a G-interpolation part 301.

Further, when the contrast evaluation value in the vertical direction is smaller than the other value, the G-interpolation part 301 regards that a brightness structure at the R-pixel position is a vertical linear structure, and sets an average value of the pieces of G-component data of the two G-pixels adjacent to the R-pixel position at the top and bottom, to G-component data at the R-pixel position, as illustrated in FIG. 7A. Note that the G-component data generated here is the temporary G-component data used for generating the first color-difference data Cr.

Figure 7B:
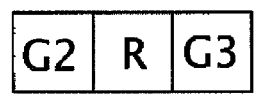

Further, when the contrast evaluation value in the horizontal direction is smaller than the other value, the G-interpolation part 301 regards that the brightness structure at the R-pixel position is a horizontal linear structure, and sets an average value of the pieces of G-component data of the two G-pixels adjacent to the R-pixel position at the left and right, to the G-component data at the R-pixel position, as illustrated in FIG. 7B. Note that the G-component data generated here is the temporary G-component data used for generating the first color-difference data Cr.

Figure 7C:
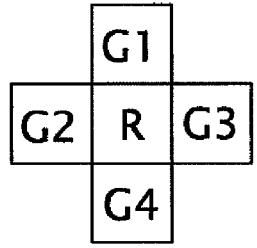

However, when a variation in the above-described two types of contrast evaluation values is less than a threshold value, the G-interpolation part 301 regards that the brightness structure at the R-pixel position is uniform, and sets an average value of pieces of G-component data of the four G-pixels adjacent to the R-pixel position at the top, bottom, left and right, to the G-component data at the R-pixel position, as illustrated in FIG. 7C. Note that the G-component data generated here is the temporary G-component data used for generating the first color-difference data Cr.

(Operation of Discrete Color-Difference Generating Part 302)

The discrete color-difference generating part 302 executes the following processing with respect to each R-pixel position on the RAW image. Specifically, the discrete color-difference generating part 302 subtracts the G-component data generated by the G-interpolation part 301 with respect to the targeted R-pixel position from R-component data R at the R-pixel position, to thereby calculate the first color-difference data Cr at the R-pixel position.

Figure 8:
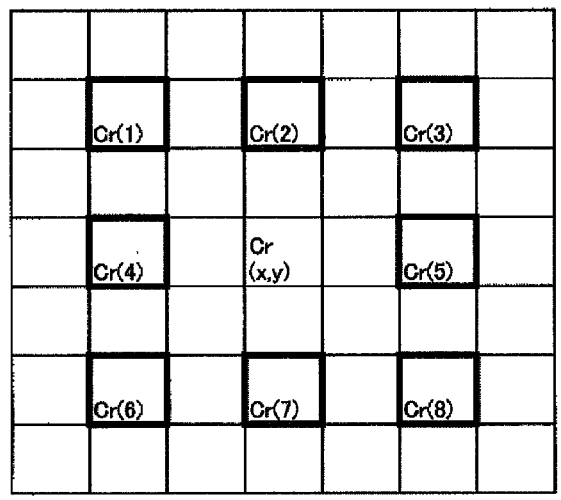
FIG. 8 is a diagram explaining a discrete color-difference image.

Here, the individual R-pixel positions are scattered on the RAW image, so that the pieces of first color-difference data Cr generated by the discrete color-difference generating part 302 with respect to the individual R-pixel positions become pieces of data distributed on the RAW image in a discrete manner, as illustrated in FIG. 8. Accordingly, in the description hereinbelow, the distribution of the pieces of first color-difference data Cr on the RAW image (which is an image formed of the pieces of first color-difference data Cr generated with respect to the respective R-pixel positions) is referred to as "discrete color-difference image".

(Operation of Smoothing Part 303)

The smoothing part 303 executes the following processings (a) to (c) with respect to each pixel on the discrete color-difference image (FIG. 8), thereby reducing a noise (color-difference noise) generated in the discrete color-difference image.

(a) The smoothing part 303 refers to pieces of first color-difference data Cr(1) to Cr(8) of eight peripheral pixels adjacent to a target pixel on the discrete color-difference image, and calculates a maximum value MAX and a minimum value MIN of the pieces of data.

(b) The smoothing part 303 applies the maximum value MAX, the minimum value MIN, and the first color-difference data Cr of the target pixel to the following expression (1), thereby generating temporary first color-difference data Cr_tmp of the target pixel.

$$\text{Cr\_tmp} = \begin{cases} \text{MAX} & \text{if (MAX} \leq Cr) \\ Cr(x, y) & \text{if (MAX} < Cr < \text{MAX)} \\ \text{MIN} & \text{if } (Cr \leq \text{MIN}) \end{cases} \quad (1)$$

According to the expression (1), the first color-difference data of the target pixel falls within a range of values of the pieces of first color-difference data of the eight peripheral pixels. Accordingly, with the use of the expression (1), when a prominent noise component (component having a value which is remarkably prominent compared to that of the peripheral pixel) is included in the first color-difference data Cr of the target pixel, the prominent noise component is removed. Accordingly, the expression (1) is an expression for reducing the prominent noise generated in the discrete color-difference image.

(c) The smoothing part 303 applies the temporary first color-difference data Cr_tmp of the target pixel and the pieces of first color-difference data Cr(1) to Cr(8) of the eight peripheral pixels to the following expression (2), thereby generating smoothed first color-difference data Cr_nr of the target pixel.

$$Cr\_nr = Cr\_tmp - \frac{1}{8}\sum_{i=1}^{8} EPS(Cr\_tmp - Cr(i), th) \quad (2)$$

$$EPS(d, th) \equiv \begin{cases} d & (\text{if } |d| \le th) \\ 0 & (\text{if } |d| > th) \end{cases}$$

According to the expression (2), the first color-difference data of the target pixel is smoothed by the pieces of first color-difference data of the eight peripheral pixels, in which, out of the eight peripheral pixels, one having a value which is deviated by a certain amount or more from that of the target pixel is excluded from a reference target of the smoothing. Therefore, according to the expression (2), it is possible to perform smoothing on the discrete color-difference image while avoiding that an edge of a structure (color-difference structure) included in the discrete color-difference image is blurred. Accordingly, the edge of the color-difference structure included in the discrete color-difference image is maintained, and only the noise (color-difference noise) generated in the discrete color-difference image is reduced. Note that processing through the expression (2) as above is also called as epsilon filter processing.

Here, th in the expression (2) is a threshold value for excluding, when the edge of the color-difference structure exists between the target pixel and the peripheral pixel, the peripheral pixel from the reference target of the smoothing, and is a threshold value common to all of the target pixels. When the threshold value th is large, a strength of reducing the color-difference noise is increased, but, it becomes highly possible that the edge of the color-difference structure is blurred. On the other hand, when the threshold value th is small, it becomes highly possible that the edge of the color-difference structure can be maintained, but, the strength of reducing the color-difference noise is decreased.

For this reason, it is desirable that the threshold value th is set to a value in accordance with a standard deviation of the color-difference noise generated in the discrete color-difference image (about three times the standard deviation, for example). Accordingly, it is desirable that the smoothing part 303 estimates the standard deviation of the color-difference noise generated in the discrete color-difference image based on a shooting condition or the discrete color-difference image, and then sets the threshold value th in accordance with the standard deviation. Note that the shooting condition is a shooting condition at the time of obtaining the RAW image, and includes a shutter speed, an aperture value, a lens position, a shooting sensitivity, and the like.

(Operation of Color-Difference Interpolation Part 304)

The color-difference interpolation part 304 performs up-sampling processing on the noise-reduced discrete color-difference image (namely, the pieces of first color-difference data Cr at the respective R-pixel positions), thereby generating pieces of first color-difference data Cr at respective B-pixel positions on the RAW image, and pieces of first color-difference data Cr at respective G-pixel positions on the RAW image.

A method of the up-sampling can apply any publicly-known method, and is as follows, for example. Specifically, the color-difference interpolation part 304 calculates an average value of pieces of first color-difference data Cr of four R-pixels positioned at the upper left, upper right, lower right, and lower left of a targeted B-pixel position, and sets the average value to first color-difference data Cr at the B-pixel position. Further, the color-difference interpolation part 304 calculates an average value of pieces of first color-difference data Cr of two R-pixels adjacent to a targeted G-pixel position at the upper and bottom, or at the left and right, and sets the average value to first color-difference data Cr at the G-pixel position. (The above is the explanation of the operation of the color-difference interpolation part 304.)

As described above, the color-difference image generating part 252 of the present embodiment (refer to FIG. 6) generates the pieces of first color-difference data Cr at the respective R-pixel positions on the RAW image, performs the noise reduction processing through the smoothing on the discrete color-difference image being a distribution of the pieces of first color-difference data Cr on the RAW image, and then performs the up-sampling of the pieces of first color-difference data Cr at the pixel positions other than the R-pixel positions (the B-pixel positions and the G-pixel positions).

In a similar manner, the color-difference image generating part 252 of the present embodiment generates the pieces of second color-difference data Cb at the respective B-pixel positions on the RAW image, performs the noise reduction processing through the smoothing on the discrete color-difference image being a distribution of the pieces of second color-difference data Cb on the RAW image, and then performs the up-sampling of the pieces of second color-difference data Cb at the pixel positions other than the B-pixel positions (the R-pixel positions and the G-pixel positions).

Therefore, the color interpolation processing part 204 of the present embodiment sets, neither the color-interpolated image nor the image before performing the color interpolation (RAW image), but the discrete color-difference image generated in a process of the color interpolation processing, as a target of the noise reduction processing.

The discrete color-difference image has a data amount smaller than that of the color-interpolated image. Therefore, in the present embodiment, it is possible to suppress a calculation amount required for the noise reduction processing, compared to a case where the color-interpolated image is set as the target of the noise reduction processing.

Further, since the discrete color-difference image is a color-difference image before performing the up-sampling, so that it reflects the color-difference noise generated in the image more accurately than the color-difference image after being subjected to the up-sampling. Therefore, in the present embodiment, it is possible to obtain a high noise reduction effect, compared to a case where the color-difference image after being subjected to the up-sampling is set as the target of the noise reduction processing.

Further, the discrete color-difference image does not include information of the brightness structure of the image (includes only the information of the color-difference structure of the image). Accordingly, in the present embodiment, even if the strength of the noise reduction processing with respect to the discrete color-difference image is increased, it is possible to aggressively reduce only the color-difference noise included in the image, without blurring the edge of the brightness structure included in the image.

Here, it is normally conceivable that the edge of the brightness structure included in the image is an important factor that exerts an influence on a visual contrast of the image, compared to the edge of the color-difference structure included in the image. Further, it is conceivable that the color-difference noise generated in the image is easily noticeable, compared to the brightness noise generated in the image.

Therefore, it is conceivable that the availability of the present embodiment capable of aggressively reducing only the color-difference noise while maintaining the edge of the brightness structure, is quite high.

Modified Example of First Embodiment

Note that in the first embodiment, the combination of the prominent noise reduction processing (expression (1)) and the epsilon filter processing (expression (2)) is applied as spatial smoothing processing with respect to the discrete color-difference image, but, in a case where an amount of prominent noise generated in the discrete color-difference image is small or the like, it is also possible to omit the prominent noise reduction processing (expression (1)). Note that the amount of prominent noise generated in the discrete color-difference image may be estimated from the discrete color-difference image, or may also be estimated from the shooting condition at the time of obtaining the RAW image (the shutter speed, the aperture value, the lens position, the shooting sensitivity, and the like).

Further, in the first embodiment, the range of reference for the smoothing regarding each of the target pixels on the discrete color-difference image is set to the range of nine pixels of 3×3 in which the target pixel is set as the center (refer to FIG. 8), but, the range may also be set to a wider range.

Further, in the first embodiment, the combination of the prominent noise reduction processing (expression (1)) and the epsilon filter processing (expression (2)) is applied as the spatial smoothing processing with respect to the discrete color-difference image, but, it is also possible to apply another publicly-known smoothing processing as long as it is spatial smoothing processing having a noise reduction effect.

Further, the first embodiment describes the noise reduction processing with respect to the discrete color-difference image (namely, the color-difference noise reduction processing), in which it is also possible to use brightness noise reduction processing (publicly-known) in the color-difference noise reduction processing, in a combined manner. The brightness noise reduction processing may be executed by the brightness image generating part 251 after generating the brightness image or in a process of generating the brightness image.

Further, although the first embodiment describes the electronic camera 101, a part or all of the color interpolation processing function of the electronic camera 101 may be mounted on another image processing apparatus having no imaging function, or may also be mounted on an image processing software which can be executed by a computer.

Note that the image processing software is an image processing software installed in a computer via a storage medium or a communication network, and capable of reading a RAW image file created by the electronic camera 101 or another electronic camera and performing color interpolation processing on a RAW image stored in the RAW image file.

Second Embodiment

Hereinafter, an electronic camera will be described as a second embodiment of the present invention. The present embodiment is a modified example of the first embodiment, so that only a point of difference between the second embodiment and the first embodiment will be described here.

Figure 9:
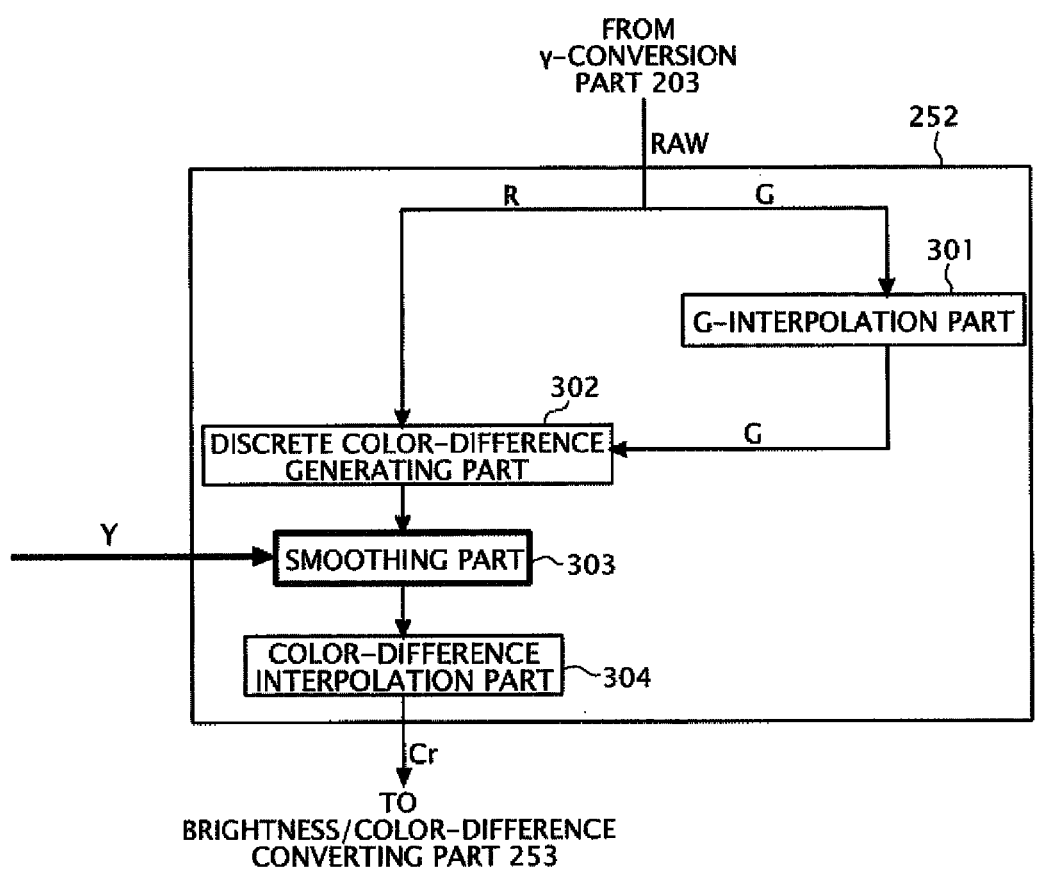
FIG. 9 is a block diagram illustrating a configuration of the color-difference image generating part 252 of a second embodiment.

FIG. 9 is a block diagram illustrating a configuration of the color-difference image generating part 252 of the present embodiment. As illustrated in FIG. 9, the smoothing part 303 of the color-difference image generating part 252 in the present embodiment uses the brightness image (brightness data Y) generated by the brightness image generating part 251 (refer to FIG. 2), in the smoothing processing with respect to the discrete color-difference image.

Note that the processing procedure of the smoothing part 303 at the time of generating the first color-difference data Cr and the processing procedure of the smoothing part 303 at the time of generating the second color-difference data Cb are different only in that the former is processing regarding the R-pixel, and the latter is processing regarding the B-pixel. Accordingly, only an operation of the smoothing part 303 at the time of generating the first color-difference data Cb will be explained here as representative.

(Operation of Smoothing Part 303)

The smoothing part 303 performs the following processings (d) to (g) on the respective pixels on the discrete color-difference image (FIG. 8) generated by the discrete color-difference generating part 302, thereby reducing a noise (color-difference noise) generated in the discrete color-difference image.

Figure 10:
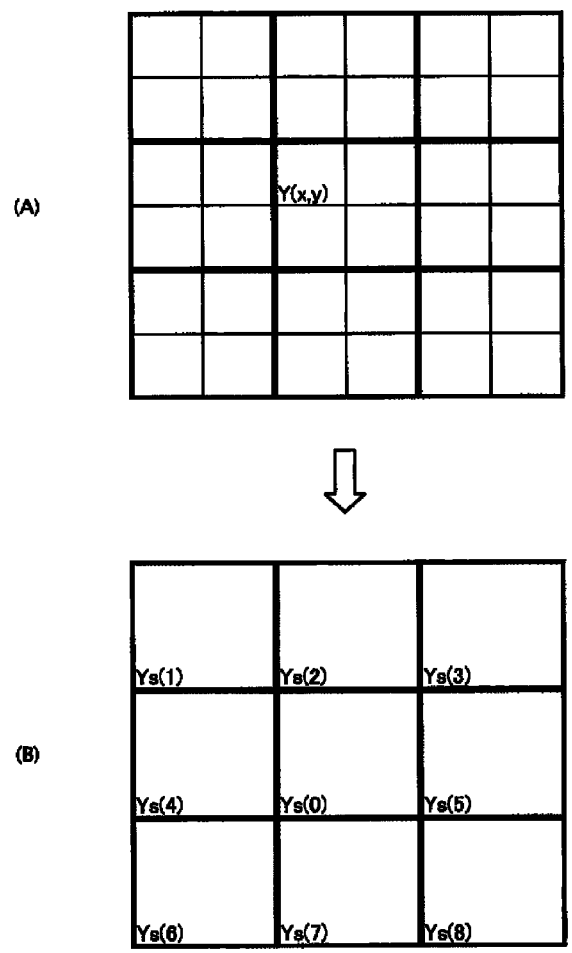
FIG. 10 is diagram explaining processing (d) of a smoothing part 303 of the second embodiment.

(d) In order to match an image size of the brightness image generated by the brightness image generating part 251 (refer to FIG. 2) to an image size of the discrete color-difference image, the smoothing part 303 performs size reducing process on the brightness image. Concretely, the smoothing part 303 refers to a pixel block (four pixels) on the brightness image corresponding to the target pixel on the discrete color-difference image, and sets an average value of pieces of brightness data Y of four pixels positioned at the pixel block, to brightness data Ys of the target pixel. (The brightness data Ys is brightness data of the size-reduced brightness image.) Further, the smoothing part 303 also performs the generation of brightness data Ys as above with respect to each of eight peripheral pixels adjacent to the target pixel. Accordingly, as illustrated from (A) of FIG. 10 to (B) of FIG. 10, the brightness data Ys(0) of the target pixel and pieces of brightness data Ys(1) to Ys(8) of the eight peripheral pixels are generated.

(e) The smoothing part 303 refers to pieces of first color-difference data Cr(1) to Cr(8) of the eight peripheral pixels, and calculates a maximum value MAX and a minimum value MIN of the pieces of data.

(f) The smoothing part 303 applies the maximum value MAX, the minimum value MIN, and the first color-difference data Cr of the target pixel to the aforementioned expression (1), thereby generating temporary first color-difference data Cr_tmp of the target pixel.

(g) The smoothing part 303 applies the temporary first color-difference data Cr_tmp of the target pixel, the pieces of first color-difference data Cr(1) to Cr(8) of the eight peripheral pixels, the brightness data Ys(0) of the target pixel, and the pieces of brightness data Ys(1) to Ys(8) of the eight peripheral pixels to the following expression (2'), thereby generating smoothed first color-difference data Cr_nr of the target pixel.

$$Cr\_nr = Cr\_tmp - \frac{1}{8}\sum_{i=1}^{8} EPS(Cr\_tmp - Cr(i), th2 - |Ys(0) - Ys(i)|) \quad (2')$$

-continued $$EPS(d, th) \equiv \begin{cases} d & (\text{if } |d| \leq th) \\ 0 & (\text{if } |d| > th) \end{cases}$$

The processing in the expression (2') is the epsilon filter processing, similar to the aforementioned expression (2), but, a threshold value (th2−|Ys(0)−Ys(i)|) for maintaining an edge of color-difference structure changes in accordance with the pieces of brightness data Ys(0) to Ys(8) of the target pixel and the peripheral pixels.

With the use of the variable threshold value as above, when an edge of brightness structure exists between the target pixel and the peripheral pixel, the peripheral pixel is excluded from the reference target of the smoothing, and when no edge of brightness structure exists, the peripheral pixel is included in the reference target of the smoothing.

Therefore, for example, even in a case where a contrast of color-difference noise generated in the image is high, and the color-difference structure of the image is buried in the color-difference noise, it is possible to reduce only the color-difference noise while maintaining the edge of the color-difference structure.

Note that it is desirable that th2 (reference value of the threshold value) in the expression (2') is set to a value in accordance with a sum of a standard deviation of the color-difference noise generated in the discrete color-difference image and a standard deviation of the brightness noise generated in the brightness image (about three times the sum, for example). Accordingly, it is desirable that the smoothing part 303 estimates not only the standard deviation of the color-difference noise generated in the discrete color-difference image based on the shooting condition or the discrete color-difference image but also the standard deviation of the brightness noise generated in the brightness image based on the shooting condition or the brightness image, and then sets the reference value th2 in accordance with the standard deviations. Note that the shooting condition is a shooting condition at the time of obtaining the RAW image, and includes a shutter speed, an aperture value, a lens position, a shooting sensitivity, and the like. (The above is the explanation of the operation of the smoothing part 303.)

As described above, the color-difference image generating part 252 of the present embodiment (FIG. 9) appropriately sets a parameter of the smoothing processing (concretely, the reference target of the smoothing) with respect to the discrete color-difference image in accordance with the brightness structure of the image, so that it is possible to deal with color-difference noises with various contrasts. Therefore, in the present embodiment, it is possible to perform noise reduction processing which is more effective than the first embodiment.

Note that the method of size reduction of the brightness image in the present embodiment is not limited to the above-described method, and may also apply another publicly-known method.

Further, the present embodiment can also be modified, similar to the first embodiment.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing apparatus, comprising:
an image inputting part inputting an image in which a first pixel group and a second pixel group indicating mutually different color components are included and at least pixels of the second pixel group are arranged in discrete positions;
a color estimating part estimating first color component data at the discrete pixel positions of the second pixel group based on first color component data belong to pixels of the first pixel group;
a calculating part calculating color-difference data at the discrete pixel positions of the second pixel group based on the first color component data being estimated at the discrete pixel positions of the second pixel group and second color component data belong to the pixels of the second pixel group;
a smoothing part performing smoothing processing on a discrete color-difference image formed of the color-difference data being calculated at the discrete pixel positions of the second pixel group; and
a color-difference estimating part estimating color-difference data at pixel positions of pixel group other than the second pixel group on the image input by the image inputting part based on the discrete color-difference image after being smoothed.

2. The image processing apparatus according to claim 1, wherein
the smoothing processing includes prominent noise reduction processing.

3. The image processing apparatus according to claim 1, further comprising:
a brightness generating part estimating brightness data at pixel positions of pixel groups on the image input by the image inputting part based on the first color component data of the pixels of the first pixel group and the second color component data of the pixels of the second pixel group; and
a reducing part performing, on a brightness image formed of the brightness data being estimated at the pixel positions of the pixel groups, size reducing process for matching an image size of the brightness image to an image size of the discrete color-difference image, wherein
the smoothing part sets a parameter of the smoothing processing based on the brightness image after being reduced in size.

4. An imaging apparatus, comprising:
a color imaging sensor obtaining an image in which a first pixel group and a second pixel group indicating mutually different color components are included and at least pixels of the second pixel group are arranged in discrete positions; and
the image processing apparatus according to claim 1 inputting and processing the image.

5. A non-transitory computer readable storage medium storing an image processing program causing a computer to execute:
an image inputting step inputting an image in which a first pixel group and a second pixel group indicating mutually different color components are included and at least pixels of the second pixel group are arranged in discrete positions;
a color estimating step estimating first color component data at the discrete pixel positions of the second pixel group based on first color component data belong to pixels of the first pixel group;

a calculating step calculating color-difference data at the discrete pixel positions of the second pixel group based on the first color component data being estimated at the discrete pixel positions of the second pixel group and second color component data belong to the pixels of the second pixel group;

a smoothing step performing smoothing processing on a discrete color-difference image formed of the color-difference data being calculated at the discrete pixel positions of the second pixel group; and a color-difference estimating step estimating color-difference data at pixel positions of pixel group other than the second pixel group on the image input by the image inputting step based on the discrete color-difference image after being smoothed.

6. An image processing method, comprising:

an image inputting step inputting an image in which a first pixel group and a second pixel group indicating mutually different color components are included and at least pixels of the second pixel group are arranged in discrete positions;

a color estimating step estimating first color component data at the discrete pixel positions of the second pixel group based on first color component data belong to pixels of the first pixel group;

a calculating step calculating color-difference data at the discrete pixel positions of the second pixel group based on the first color component data being estimated at the discrete pixel positions of the second pixel group and second color component data belong to the pixels of the second pixel group;

a smoothing step performing smoothing processing on a discrete color-difference image formed of the color-difference data calculated at the discrete pixel positions of the second pixel group; and a color-difference estimating step estimating color-difference data at pixel positions of pixel group other than the second pixel group on the image input by the image inputting step based on the discrete color-difference image after being smoothed.

* * * * *